United States Patent
Shin et al.

(10) Patent No.: US 10,510,281 B2
(45) Date of Patent: Dec. 17, 2019

(54) IMAGE PROCESSING APPARATUS AND METHOD, AND ELECTRONIC DEVICE

(71) Applicant: SAMSUNG ELECTRONICS CO., LTD., Suwon-si (KR)

(72) Inventors: Ho Seok Shin, Hwaseong-si (KR); Un Ki Park, Suwon-si (KR); Se Whan Na, Seoul (KR); Jae Youl Lee, Hwaseong-si (KR); Jong Hyuk Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 15/646,227

(22) Filed: Jul. 11, 2017

(65) Prior Publication Data

US 2018/0114476 A1 Apr. 26, 2018

(30) Foreign Application Priority Data

Oct. 24, 2016 (KR) .................. 10-2016-0138624

(51) Int. Cl.
*G06K 9/46* (2006.01)
*G09G 3/20* (2006.01)

(52) U.S. Cl.
CPC ......... *G09G 3/2003* (2013.01); *G06K 9/4652* (2013.01); *G06K 9/4661* (2013.01); *G09G 2300/0452* (2013.01); *G09G 2320/0242* (2013.01); *G09G 2320/0666* (2013.01); *G09G 2340/10* (2013.01)

(58) Field of Classification Search
None
See application file for complete search history.

(56) References Cited

U.S. PATENT DOCUMENTS

| | | | |
|---|---|---|---|
| 5,966,462 A | 10/1999 | Linder et al. | |
| 7,755,649 B2 | 7/2010 | Brown Elliott et al. | |
| 8,203,582 B2 | 6/2012 | Elliott et al. | |
| 8,519,910 B2 | 8/2013 | Park et al. | |
| 8,988,417 B2 | 3/2015 | Kim et al. | |
| 9,355,587 B2 | 5/2016 | Su et al. | |
| 2003/0043905 A1* | 3/2003 | Nakayama | H04N 1/411 375/240.04 |
| 2005/0195418 A1* | 9/2005 | Gerrits | H04N 1/54 358/1.9 |
| 2008/0094515 A1* | 4/2008 | Gutta | H04N 9/73 348/602 |
| 2010/0182449 A1* | 7/2010 | Liao | H04N 5/142 348/222.1 |

(Continued)

FOREIGN PATENT DOCUMENTS

JP 2007257378 A 10/2007
JP 2013183438 A 9/2013

*Primary Examiner* — Parul H Gupta
(74) *Attorney, Agent, or Firm* — Sughrue Mion, PLLC (57) ABSTRACT

An image processing apparatus includes: an analyzer configured to calculate color characteristics by input pixel data, and determine whether the pixel data is achromatic based on the color characteristics; a first renderer configured to perform a first rendering on the pixel data in response to determining that the pixel data is not achromatic; and a second renderer configured to perform a second rendering on the pixel data in response to determining that the pixel data is achromatic.

18 Claims, 6 Drawing Sheets

(56) References Cited

U.S. PATENT DOCUMENTS

| | | | |
|---|---|---|---|
| 2010/0220924 A1* | 9/2010 | Lee | G06K 9/4652 |
| | | | 382/164 |
| 2015/0304522 A1* | 10/2015 | Van Herpen | H04N 5/913 |
| | | | 380/210 |
| 2015/0305117 A1* | 10/2015 | Van Herpen | H05B 37/0227 |
| | | | 315/153 |
| 2015/0312540 A1* | 10/2015 | Tuna | H04N 9/735 |
| | | | 348/223.1 |
| 2015/0339827 A1* | 11/2015 | Oka | G06T 11/001 |
| | | | 382/199 |
| 2016/0035292 A1 | 2/2016 | Lee et al. | |
| 2017/0098432 A1* | 4/2017 | Heo | G09G 3/2074 |

\* cited by examiner

IMAGE PROCESSING APPARATUS AND METHOD, AND ELECTRONIC DEVICE

CROSS-REFERENCE TO THE RELATED APPLICATION

This application claims priority from Korean Patent Application No. 10-2016-0138624, filed on Oct. 24, 2016, in the Korean Intellectual Property Office, the disclosure of which is incorporated by reference herein in its entirety.

BACKGROUND

1. Field

Apparatuses and methods consistent with exemplary embodiments described herein relate to image processing.

2. Description of the Related Art

Display panels are configured using a plurality of pixels. Each pixel may be configured of a plurality of subpixels emitting, for example, red (R), green (G) and blue (B) light, respectively. The subpixels emit light of respective colors.

A uniform display panel has the same numbers or areas of subpixels emitting light of respective colors. In contrast, a non-uniform display panel has different numbers or different areas of subpixels emitting light of respective colors.

However, in the non-uniform display panels, color shift within a color may occur due to non-uniform characteristics of subpixels emitting light having respective colors. In particular, since achromatic colors are easily perceivable by people, users may react more sensitively to color shifts of achromatic colors.

In the related art, in order to reduce such color shifts, a technology of controlling outputs between subpixels using nonlinear outputs after rendering of pixel data has been used.

SUMMARY

In accordance with one or more exemplary embodiments, there is provided an image processing apparatus which may include: an analyzer configured to calculate color characteristics by input pixel data, and determine whether the pixel data is achromatic based on the color characteristics; a first renderer configured to perform a first rendering on the pixel data in response to determining that the pixel data is not achromatic; and a second renderer configured to perform a second rendering on the pixel data in response to determining that the pixel data is achromatic.

In accordance with one or more exemplary embodiments, there is provided an image processing method which may include: calculating color characteristics of input pixel data; determining whether the pixel data is achromatic based on the color characteristics; performing a first rendering on the pixel data in response to determining that the pixel data is not achromatic; and performing a second rendering on the pixel data in response to determining that the pixel data is achromatic.

In accordance with one or more exemplary embodiments, there is provided an image processing apparatus which may include: an analyzer configured to determine whether input pixel data of a pixel is achromatic; and a renderer configured to render the pixel data of the pixel differently according to a result of the determination, wherein in response to the pixel data not being achromatic, the render performs a first rendering on the pixel data by applying a same weight to a plurality of subpixels of the pixel, and wherein in response to the pixel data being achromatic, the render performs a second rendering on the pixel data by applying different weights to the plurality of subpixels of the pixel.

In accordance with one or more exemplary embodiments, there is provided an electronic device which may include: a non-uniform display panel in which each pixel has different numbers or different areas of subpixels emitting light of respective colors; a processor to process pixel data transmitted from a camera sensor or a memory; and a display driver to analyze the pixel data input from the processor to calculate color characteristics of the pixel data, perform rendering using different rendering weight sets according to the calculated color characteristics, and drive the non-uniform display panel based on a rendering result.

BRIEF DESCRIPTION OF THE DRAWINGS

Features will become apparent to those of skill in the art by describing in detail exemplary embodiments with reference to the attached drawings, in which.

DETAILED DESCRIPTION

Hereinafter, exemplary embodiments of the present inventive concept will be described with reference to the accompanying drawings.

Figure 1:
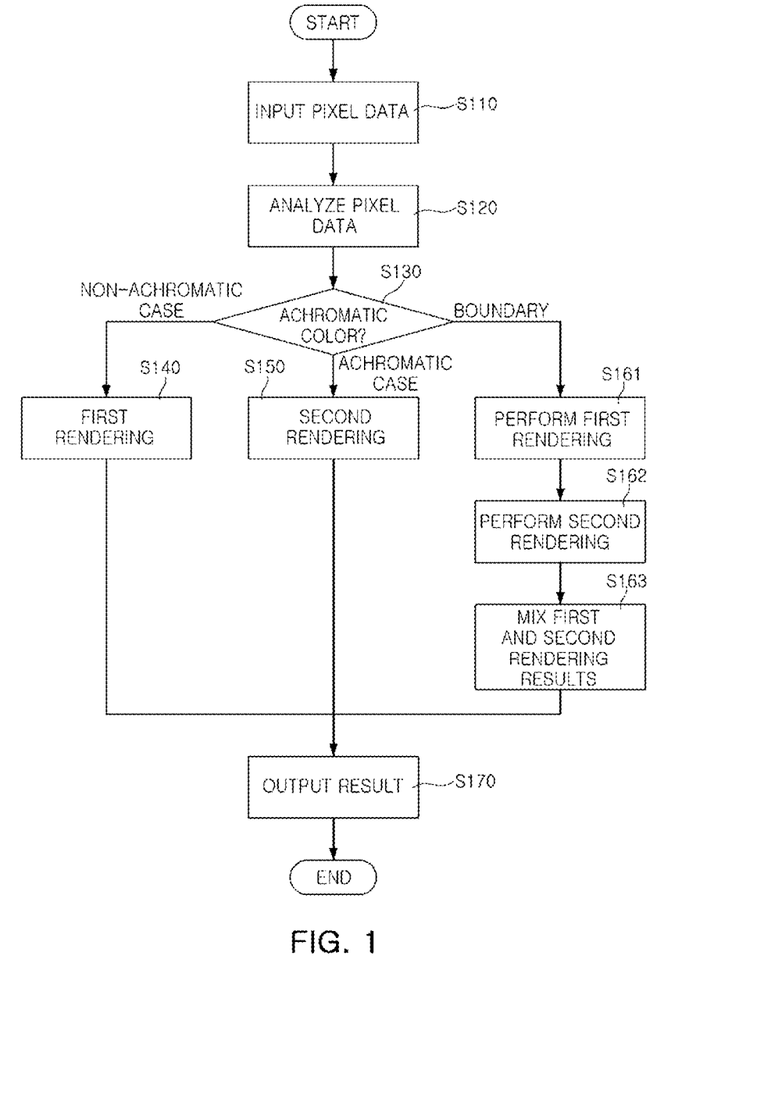
FIG. 1 illustrates an image processing method according to an exemplary embodiment.

FIG. 1 illustrates an image processing method according to an exemplary embodiment.

Referring to FIG. 1, first, pixel data of respective pixels may be input in S110, and the input pixel data may be analyzed to calculate color characteristics in S120.

The input pixel data may be analyzed and represented by a Hue-Saturation-Value (HSV) color space.

Figure 2:
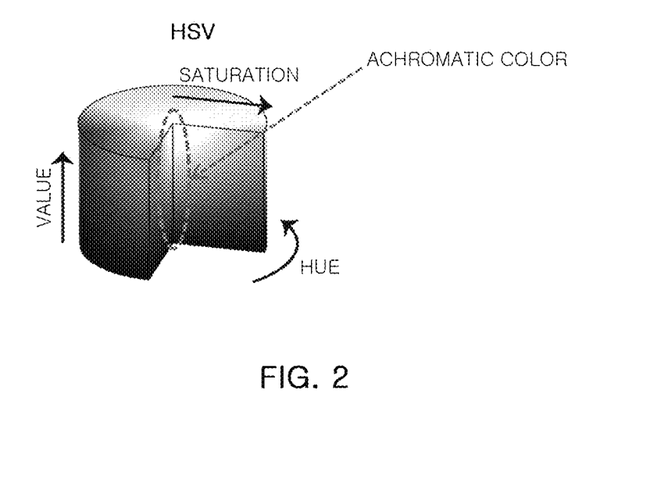
FIG. 2 illustrates a Hue-Saturation-Value (HSV) color space according to an exemplary embodiment.

FIG. 2 illustrates an HSV color space according to an exemplary embodiment. The HSV color space may represent colors through coordinates of hue, saturation, and brightness (value).

In this case, a hue value H refers to a relative arrangement angle, with respect to red provided at 0 degree and having a longest wavelength in a color wheel in which the visible light spectrum is arranged in a ring shape. H is in a range of 0 degree to 360 degree, and 360° and 0° indicate a single red color.

In addition, a saturation value S refers to a degree of darkness when a darkest degree of any color is 1.0, and a saturation value 0 refers to an achromatic color having the same brightness level.

In addition, a brightness value V refers to a degree of brightness when white, red, and the like are 1.0 and black is 0.

Input pixel data may be analyzed and the brightness value V and the saturation value S thereof may be calculated according to following Equations 1 and 2, in S120.

$$V=\max(R,G,B) \tag{1}$$

$$S=(\max(R,G,B)-\min(R,G,B))/\max(R,G,B) \tag{2}$$

However, a method of calculating the brightness value V and the saturation value S is not limited to the above-described method. For example, the brightness value V and the saturation value S may be calculated by analyzing input pixel data using various other methods known in the art.

In addition, in S120, a variable P may be calculated according to following Equation 3, based on the brightness value V and the saturation value S, and the calculated variable P may be used to determine an achromatic color boundary, in S130 to be described later, and used to adjust a mixture ratio of a first rendering result and a second rendering result, in S163 to be described later.

$$P=F(S,V) \tag{3}$$

In above Equation 3, a function F( ) for calculation of the variable P may be a function by which an output close to 1.0 is generated as the saturation value S is reduced and the brightness value V is increased.

In detail, the variable P of the pixel data may be calculated to be 1.0 when the pixel data is achromatic, calculated to be 0 when the pixel data is non-achromatic, and calculated to be a value between 0 and 1.0 when the pixel data corresponds to an achromatic color boundary.

For example, the variable P may be calculated according to a function, such as following Equation 4.

$$P=P\_S*P\_V \tag{4}$$

In above Equation 4, P_S has a reduced value as the saturation value S is increased, and P_V may have an increased value as the brightness value V is increased. For example, when the pixel data is achromatic, the variable P thereof may be calculated as 1.0, and when the pixel data is not achromatic, the P_S and P_V values may be set such that the variable P thereof is calculated as zero (0).

Subsequently, it may be determined whether a color of pixel data is achromatic, based on an analysis result of the pixel data, for example, color characteristics in S130.

The brightness value V and the saturation value S calculated in S120 may be compared with a predetermined brightness reference range and a predetermined saturation reference range, respectively, thereby determining whether a color of the pixel data is achromatic in S130.

For example, when the brightness value V is within a predetermined brightness reference range of 0.2 to 1.0 and the saturation value S is within a predetermined saturation reference range of 0 to 0.2, the pixel data may be determined to be an achromatic color, and if not, the pixel data may be determined to be a non-achromatic color.

In the determination result, if it is determined that the pixel data is not achromatic, the first rendering may be performed in S140.

In this case, the first rendering may be a normal rendering performed on non-achromatic pixel data. For example, the first rendering may be performed according to a predetermined basic weight set within a system.

Figure 3A:
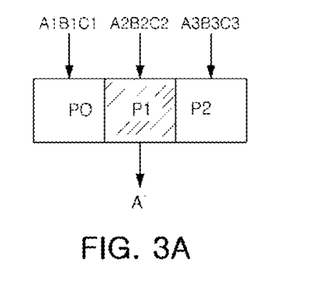
FIGS. 3A and 3B illustrate a first rendering according to exemplary embodiments.
Figure 3B:
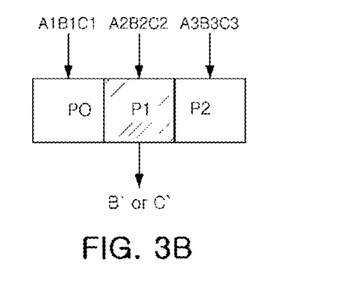

FIGS. 3A and 3B illustrate the first rendering, according to exemplary embodiments. For example, in a result of analysis of pixel data A2B2C2 of a pixel P1, if it is determined that the pixel data A2B2C2 of the pixel P1 is not achromatic, the pixel data A2B2C2 of the pixel P1 and pixel data A1B1C1 and A3B3C3 of pixels P0 and P2 adjacent thereto may be subjected to rendering performed by applying the predetermined basic weight set thereto in the system, and rendering results A', B' and C' may be output.

FIGS. 3A and 3B illustrate examples in which subpixels of a non-uniform display panel have a form of AABC. Here, A, B and C represents respective subpixels of a pixel such as the pixel P1. As illustrated in FIG. 3A, the output A' of the pixel P1 may be calculated by following Equation 5, and as illustrated in FIG. 3B, the outputs B' and C' of the pixel P1 may be calculated according to Equations 6 and 7, respectively.

$$A'=A1*0.33+A2*0.33+A3*0.33 \tag{5}$$

$$B'=B1*0.33+B2*0.33+B3*0.33 \tag{6}$$

$$C'=C1*0.33+C2*0.33+C3*0.33 \tag{7}$$

As described above, for example, if it is determined that the pixel data of a pixel is not achromatic, the rendering may be performed by the predetermined basic weight set in the system, without considering non-uniform characteristics of subpixels of the display panel.

In addition, the basic weight sets applied to the respective pixel data in above Equations 5 to 7 are only be provided by way of example, and may thus be set differently depending on an operating environment of a system.

On the other hand, if it is determined that the pixel data of a pixel is achromatic, a second rendering may be performed in S150.

In this case, the second rendering may be rendering performed on achromatic pixel data according to first and second weight sets set by a user.

In detail, among a plurality of subpixels constituting a display panel, subpixels of a relatively large number or area for emitting light of a color may be subjected to rendering performed according to the first weight set, and subpixels of a relatively small number or area for emitting light of another color may be subjected to rendering performed according to the second weight set.

Figure 4A:
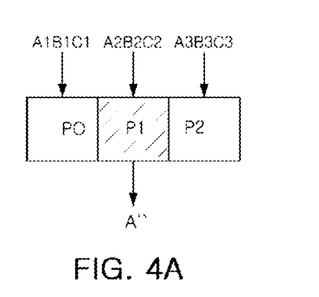
FIGS. 4A and 4B illustrate a second rendering according to exemplary embodiments.
Figure 4B:
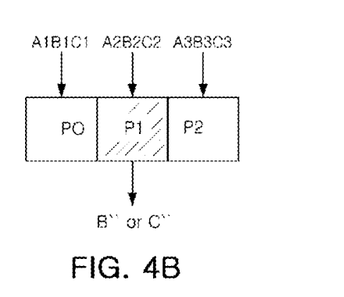

FIGS. 4A and 4B illustrate the second rendering according to exemplary embodiments. For example, in a result of analysis of pixel data A2B2C2 of a pixel P1, if it is determined that the pixel data A2B2C2 of the pixel P1 is achromatic, the pixel data A2B2C2 of the pixel P1 and pixel data A1B1C1 and A3B3C3 of pixels P0 and P2 adjacent thereto may be subjected to rendering performed by applying the first weight set or the second weight set thereto, and rendering results A", B", and C" may be output.

FIGS. 4A and 4B illustrate examples in which subpixels of a non-uniform display panel have a form of AABC. As illustrated in FIG. 4A, the output A" of the pixel P1 may be calculated by following Equation 8, and as illustrated in FIG. 4B, the outputs B" and C" of the pixel P1 may be calculated according to Equations 9 and 10, respectively. In this case, the weight sets applied to the calculation of B" and C" may be different from each other or may be the same.

$$A''=A1*0.1+A2*0.8+A3*0.1 \tag{8}$$

$$B''=B1*0.2+B2*0.8+B3*0.0 \tag{9}$$

$$C''=C1*0.0+C2*0.8+C3*0.2 \tag{10}$$

As described above, for example, if it is determined that the pixel data is achromatic, the rendering may be performed by the first weight set and the second weight set which are set by a user, by considering non-uniform characteristics of subpixels of the display panel.

In addition, the first weight set and the second weight set applied to respective pixel data in Equations 8 to 10 are provided by way of example, and may be adjusted according to a setting value set by the user.

However, for example, when the pixel data is achromatic, in order to substantially reduce a color shift in the pixel data caused by neighboring pixels, weights of pixel data applied to the neighboring pixels may be set to be lower.

If it is determined in S130 that the pixel data corresponds to an achromatic color boundary, both the first rendering and the second rendering may be performed thereon in S161 and S162, and a first rendering result and a second rendering result may be mixed in S163. In this case, the first rendering and the second rendering may be sequentially performed as illustrated in FIG. 1, or may be performed in a reverse order or in parallel.

In this case, for example, if the variable P calculated in S120 is a value within a range of 0 to 1.0, it may be determined that the pixel data corresponds to an achromatic color boundary, and in this case, the first rendering and the second rendering on the pixel data may both be performed in S161 and S162.

In addition, a final result $A_f$ may be generated by mixing the first rendering result and the second rendering result according to Equation 11, based on the variable P, in S163.

$$A_f = A'*(1.0-P) + A''*P \qquad (11)$$

Then, the rendering result may be output in S170. In detail, for example, if it is determined that the pixel data is not achromatic, the first rendering result A' may be output, if it is determined that the pixel data is achromatic, the second rendering result A" may be output, and if it is determined that the pixel data corresponds to an achromatic color boundary, the final result $A_f$ generated by mixing the first rendering result and the second rendering result may be output.

The image processing method described above with reference to FIG. 1 may be performed on pixel data of respective pixels constituting an image.

Figure 5:
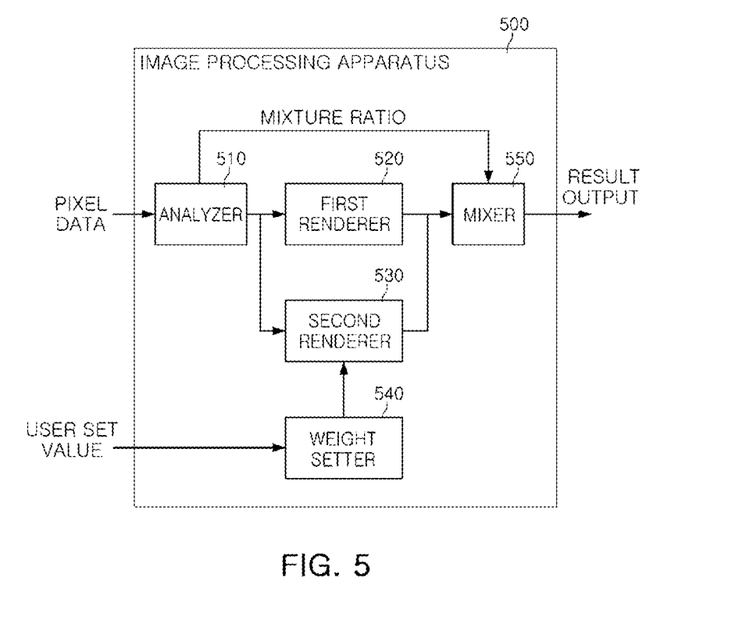
FIG. 5 illustrates an image processing apparatus according to an exemplary embodiment.

FIG. 5 illustrates an image processing apparatus according to an exemplary embodiment.

Referring to FIG. 5, an image processing apparatus 500 includes an analyzer 510, a first renderer 520, a second renderer 530, a weight setter 540, and a mixer 550.

The analyzer 510 may be provided to analyze input pixel data and calculate color characteristics. For example, the analyzer 510 may analyze input pixel data to thus represent the pixel data in the HSV color space described above with reference to FIG. 2.

The analyzer 510 may analyze the pixel data to thus calculate a brightness value V and a saturation value S, and may calculate a variable P, based on the calculated brightness value V and saturation value S.

In addition, the analyzer 510 may determine whether the pixel data is achromatic or corresponds to an achromatic color boundary, based on the analysis result described above, for example, color characteristics.

A detailed description of a method of calculating the brightness value V, the saturation value S and the variable P, and of determining whether the pixel data is achromatic or corresponds to an achromatic color boundary is identical to the description above with reference to FIG. 1, and thus, descriptions overlapped therewith will be omitted.

The first renderer 520 may perform a first rendering on the pixel data determined not to be achromatic by the analyzer 510.

In addition, the first renderer 520 may perform the first rendering on the pixel data determined to correspond to an achromatic color boundary by the analyzer 510.

In this case, the first rendering may be a normal rendering performed on pixel data. For example, the first rendering may be performed according to a predetermined basic weight set within a system. Since a detailed description of a method of performing the first rendering may be identical to the description above with reference to FIGS. 1 and 3, descriptions overlapped therewith will be omitted.

The second renderer 530 may perform a second rendering on the pixel data determined to be achromatic by the analyzer 510.

In addition, the second renderer 530 may perform the second rendering on the pixel data determined to correspond to an achromatic color boundary by the analyzer 510.

In this case, the second rendering may be rendering performed on the pixel data according to the first weight set and the second weight set, set by a user. In detail, among a plurality of subpixels constituting a display panel, a relatively large number of subpixels or subpixels displaying a color in a relatively wide area may be subjected to rendering performed according to the first weight set, and a relatively small number of subpixels or subpixels displaying another color in a relatively small area may be subjected to rendering performed according to the second weight set. Since a detailed description of a method of performing the second rendering may be identical to the description above with reference to FIGS. 1 and 4, descriptions overlapped therewith will be omitted.

The weight setter 540 may set the first weight set and the second weight set used in the second renderer 530, according to a received user set value.

The mixer 550 may output a rendering result provided by at least one of the first renderer 520 and the second renderer 530.

For example, if it is determined that the pixel data is not achromatic, the mixer 550 may output a first rendering result output by the first renderer 520, and if it is determined that the pixel data is achromatic, the mixer 550 may output a second rendering result output by the second renderer 530.

In addition, when the pixel data is determined to be an achromatic boundary, the mixer 550 may output a final result generated by mixing the first and second rendering results respectively output by the first renderer 520 and the second renderer 530. A detailed description of a method of mixing the first rendering result and the second rendering result by the mixer 550 may be identical to the description above with reference to FIG. 1, and thus, descriptions overlapped therewith will be omitted.

Although FIG. 5 illustrates the first renderer 520 and the second renderer 530 as separate configurations, the first renderer 520 and the second renderer 530 may be both provided to perform rendering of input pixel data, and thus, may only have a difference in terms of weight sets applied to rendering.

Thus, the first renderer 520 and the second renderer 530 may be implemented by a single renderer (not shown) storing a plurality of weight sets, and may be implemented to perform rendering by selecting an appropriate weight set according to an analysis result provided by the analyzer 510.

Figure 6:
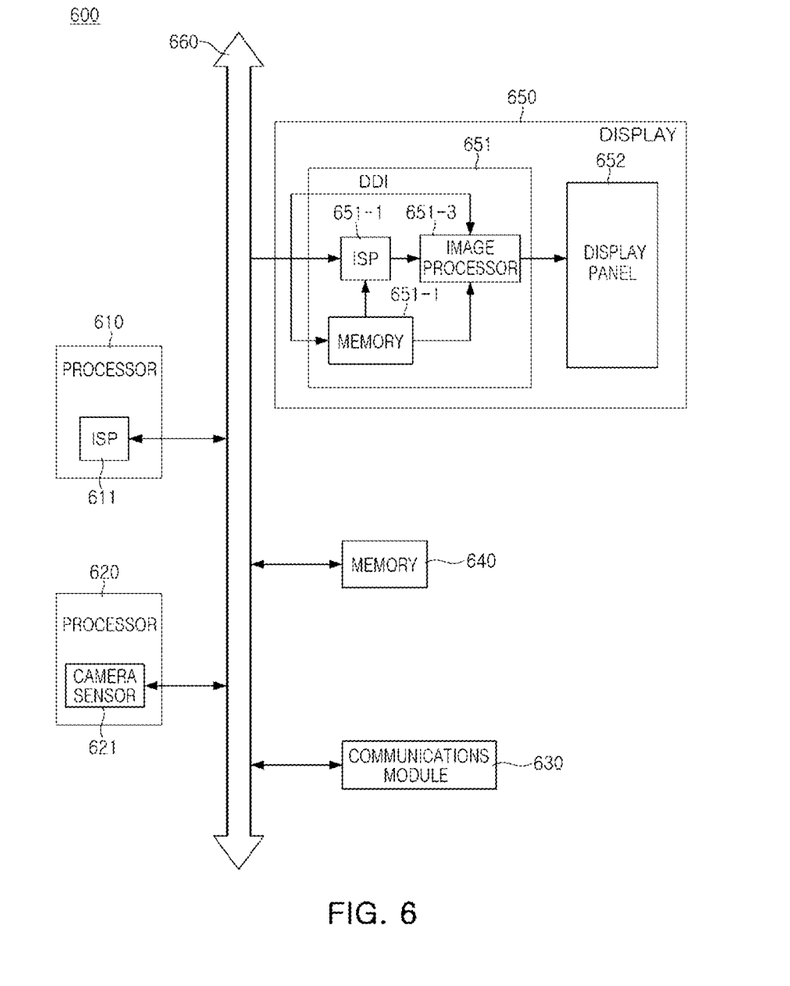
FIG. 6 illustrates an electronic device including an image processing apparatus, according to an exemplary embodiment.

FIG. 6 illustrates an electronic device according to an exemplary embodiment.

Referring to FIG. 6, an electronic device 600 may include a processor 610, a sensor module 620, a communications module 630, a memory 640, a display 650, and the like. Respective elements constituting the electronic device 600 may communicate with each other via a bus 660 to transfer data. Examples of the electronic device 600 may include a television, a desktop computer, and the like, as well as mobile devices such as smart phones, tablet PCs, laptop computers, and the like.

As illustrated in FIG. 6, the processor 610 may include an image signal processor (ISP) 611 for processing image signals, and the ISP 611 may process image data transmitted by a camera sensor 621 or image data transmitted by the memory 640, and may then provide the processed image data to the display 650.

In addition, the display 650 may include a display driver IC (DDI) 651 to drive the display, and a display panel 652.

In this case, the DDI 651 may analyze pixel data input from the processor 610 to calculate color characteristics, may perform rendering by using different rendering weight sets according to the calculated color characteristics, and may drive the display panel 652, based on a rendering result. The DDI 651 may include a memory 651-1, an ISP 651-2, and an image processor 651-3.

In addition, the display panel 652 may be a non-uniform display panel including different numbers of subpixels or subpixels included in areas corresponding thereto, representing respective colors.

Data transferred by the processor 610 may be input to the image processor 651-3 through at least one of the memory 651-1 and the ISP 651-2, or may be directly input to the image processor 651-3.

In this case, the image processor 651-3 may perform the same function as that of the image processing apparatus 500 (see FIG. 5) described above according to the exemplary embodiment. The image processor 651-3 may analyze input pixel data, determine whether the pixel data is achromatic or corresponds to an achromatic color boundary, and then apply different rendering weight sets thereto according to the determined results to perform rendering. Then, the image processor 651-3 may output rendering results to the display panel 652. Detailed configurations and functions of the image processor 651-3 are identical to those described above with reference to FIG. 5.

Figure 7A:
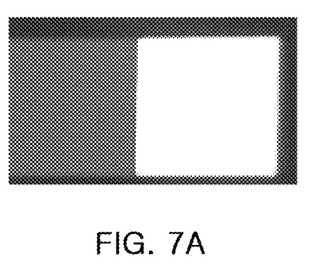
FIGS. 7A and 7B illustrate a color shift reduction effect according to exemplary embodiments.
Figure 7B:
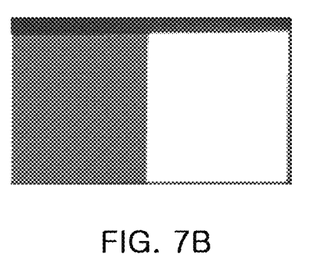

FIGS. 7A and 7B illustrate an example of a color shift reduction effect. For example, FIG. 7A illustrates an output result on a screen in a case in which an exemplary embodiment of the present inventive concept is not applied to a non-uniform display panel, while FIG. 7B illustrates an output result on a screen when an exemplary embodiment of the present inventive concept is applied to a non-uniform display panel.

FIGS. 7A and 7B illustrate outputs of the same pixel data. It can be confirmed that in the case in which an exemplary embodiment of the present inventive concept is not used, a fine white pattern may not be properly represented as illustrated in FIG. 7A, while in the case in which an exemplary embodiment of the present inventive concept is used, a fine white pattern may be properly expressed as illustrated in FIG. 7B.

As set forth above, an image processing apparatus according to an exemplary embodiment may effectively reduce color shift within an achromatic color in a non-uniform display panel, thereby accurately representing an achromatic series.

In addition, an image processing apparatus according to an exemplary embodiment may prevent an unnecessary color shift within a non-achromatic color by separately processing an achromatic color and a non-achromatic color through color analysis of pixel data.

In addition, an image processing apparatus according to an exemplary embodiment may effectively control a degree of color shift reduction in an achromatic color by allowing a rendering weight of achromatic color pixel data to be adjustable.

The operations or steps of the methods or algorithms described above, for example, in FIG. 1, can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 5 and 6 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While exemplary embodiments have been shown and described above, it will be apparent to those skilled in the art that modifications and variations could be made without departing from the scope of the present inventive concept as defined by the appended claims.

What is claimed is:
1. An image processing method comprising:
calculating color characteristics of input pixel data;
determining whether the pixel data is achromatic based on the color characteristics;
performing a first rendering on the pixel data in response to determining that the pixel data is not achromatic; and performing a second rendering on the pixel data in response to determining that the pixel data is achromatic, wherein the performing the first rendering comprises performing a rendering on the pixel data according to a predetermined basic weight set, and wherein the performing the second rendering comprises performing a rendering on the pixel data according to a first weight set and a second weight set which are set by a user.

2. The method of claim 1, wherein the calculating the color characteristics is performed by calculating a brightness value and a saturation value of the pixel data.

3. The method of claim 2, wherein the determining whether the pixel data is achromatic is performed by comparing the brightness value and the saturation value with a predetermined brightness reference range and a predetermined saturation reference range, respectively, to thus determine whether the pixel data is achromatic.

4. The method of claim 2, wherein the calculating the color characteristics further comprises calculating a variable, based on the brightness value and the saturation value, and wherein the determining whether the pixel data is achromatic further comprises determining whether the pixel data corresponds to an achromatic color boundary, which represents a color between achromatic and non-achromatic, based on the variable.

5. The method of claim 4, further comprising:
performing the first rendering and the second rendering on the pixel data determined to correspond to the achromatic color boundary; and
mixing a result of the first rendering and a result of the second rendering.

6. The method of claim 5, wherein the mixing is performed by adjusting a mixture ratio of the result of the first rendering and the result of the second rendering, based on the variable.

7. The method of claim 1, wherein the pixel data comprises pixel data of a pixel and at least one adjacent pixel.

8. The method of claim 1, wherein the pixel data comprises pixel data of a pixel comprising a plurality of subpixels emitting different colors, and wherein in the performing the second rendering, among the plurality of subpixels, a subpixel of a relatively large number or area for emitting light of a color is subjected to rendering according to the first weight set, and a subpixel of a relatively small number or area for emitting light of another color is subjected to rendering according to the second weight set.

9. An image processing apparatus comprising:
an analyzer configured to calculate color characteristics by input pixel data, and determine whether the pixel data is achromatic based on the color characteristics;
a first renderer configured to perform a first rendering on the pixel data in response to determining that the pixel data is not achromatic; and
a second renderer configured to perform a second rendering on the pixel data in response to determining that the pixel data is achromatic,
wherein the first renderer is configured to perform the first rendering on the pixel data according to a predetermined basic weight set, and
wherein the second renderer is configured to perform the second rendering on the pixel data according to a first weight set and a second weight set which are set by a user.

10. The image processing apparatus of claim 9, wherein the analyzer is configured to calculate a brightness value and a saturation value by analyzing the pixel data, and determine whether the pixel data is achromatic by comparing the brightness value and the saturation value with a predetermined brightness reference range and a predetermined saturation reference range, respectively.

11. The image processing apparatus of claim 10, wherein the analyzer is configured to calculate a variable, based on the brightness value and the saturation value, and determine whether the pixel data corresponds to an achromatic color boundary, which represents a color between achromatic and non-achromatic, based on the variable; and wherein the first renderer and the second renderer are configured to perform the first rendering and the second rendering on the pixel data determined to correspond to the achromatic color boundary, respectively.

12. The image processing apparatus of claim 11, further comprising a mixer to output one of a first rendering result output by the first renderer, a second rendering result output by the second renderer, and a final result generated by mixing the first rendering result and the second rendering result.

13. The image processing apparatus of claim 12, wherein the mixer is configured to adjust a mixture ratio of the first rendering result and the second rendering result based on the variable.

14. The image processing apparatus of claim 9, wherein the pixel data comprises pixel data of a pixel and at least one adjacent pixel.

15. The image processing apparatus of claim 9, wherein the pixel data comprises pixel data of a pixel comprising a plurality of subpixels emitting different colors, and wherein the second renderer is configured to perform rendering on a subpixel of a relatively large number or area for emitting light of a color according to the first weight set, and a subpixel of a relatively small number or area for emitting light of another color according to the second weight set, among the plurality of subpixels of the pixel.

16. The image processing apparatus of claim 9, further comprising a weight setter configured to set the first weight set and the second weight set according to an input value.

17. The image processing apparatus of claim 9, wherein a weight used in the first rendering for pixel data of an adjacent pixel of a pixel having the pixel data determined to be achromatic is set to be lower than a weight used in the second rendering for pixel data of the adjacent pixel of the pixel having the pixel data determined to be not achromatic.

18. An image processing method comprising:
calculating color characteristics of input pixel data;
determining whether the pixel data is achromatic based on the color characteristics;
performing a first rendering on the pixel data in response to determining that the pixel data is not achromatic; and
performing a second rendering on the pixel data in response to determining that the pixel data is achromatic,
wherein a weight used in the first rendering for pixel data of an adjacent pixel of a pixel having the pixel data determined to be achromatic is set to be lower than a weight used in the second rendering for pixel data of the adjacent pixel of the pixel having the pixel data determined to be not achromatic.

* * * * *